United States Patent [19]

Sprokel

[11] 3,999,838
[45] Dec. 28, 1976

[54] BEAM ADDRESSED LIQUID CRYSTAL CELLS

[75] Inventor: Gerard John Sprokel, San Jose, Calif.

[73] Assignee: International Business Machines Corporation, Armonk, N.Y.

[22] Filed: June 5, 1975

[21] Appl. No.: 584,083

[52] U.S. Cl. .................. 350/160 LC; 250/331; 252/300; 350/1
[51] Int. Cl.² .......................................... G02F 1/13
[58] Field of Search ............ 350/160 LC; 250/331; 252/300

[56] References Cited
UNITED STATES PATENTS 3,114,836  12/1963  Fergason et al. ........ 350/160 LC X
3,836,243  9/1974  Melchior ................. 350/160 LC X

*Primary Examiner*—Edward S. Bauer
*Attorney, Agent, or Firm*—Joseph E. Kieninger

[57] ABSTRACT

A beam addressed liquid crystal cell having an absorbing layer adapted to absorb energy in the infrared spectrum while transmitting substantial energy in the visible spectrum is disclosed. In a preferred embodiment the absorbing layer contains the reaction product of bis (dithiobenzil) nickel and a polyamide. This absorbing layer absorbs at least 90% of the gallium arsenide laser wavelengths and at the same time permits transmission in the visible spectrum to be of the order of 80%.

12 Claims, 4 Drawing Figures

BEAM ADDRESSED LIQUID CRYSTAL CELLS

BACKGROUND OF THE INVENTION

1. Field of the Invention

This invention relates to liquid crystal cells and more particularly to a beam addressed liquid crystal cell having an absorbing layer adapted to absorb energy in the infrared spectrum.

2. Description of the Prior Art

Liquid crystal cell technology has advanced substantially during the past five years. Thermal copy papers and systems employing various heat sensitive liquid crystal cells have been investigated vigorously. Addressing liquid crystal cells thermally is attractive because the heat involved in the phase change is small compared to the latent heat of melting of typical organic compounds. The use of an infrared light beam for the local heating of liquif crystal cells is a frequently used approach. One serious problem with this approach, however, is the fact that known liquid crystalls are essentially transparent in the near infrared spectrum. As a result, the energy of the infrared light beam is not absorbed in the liquid crystal layer but in the much thicker glass envelope on either side of it. Typically, the glass envelope and liquid crystal cell together absorb only about ten to fifteen percent of the beam energy and most of this energy is lost by heat diffusion in the glass.

The use of additive fillers in liquid crystal compositions to absorb more of the infrared energy from the beam is described in U.S. Pat. Nos. 3,666,947, 3,499,702, 3,440,620, 3,409,404 and 3,411,513. The presence of suspended absorbers in liquid crystal cells has several disadvantages due to the effect on the properties of the liquid crystal. One problem pertains to the fact that these dyes usually absorb more in the visible spectrum than in the infrared spectrum. This fact results in the display becoming a monotone color thereby nullifying the gain in the absorption of the infrared energy. Another problem concerns the liquid crystal-dye dispersion itself. The presence of the dye in the liquid crystal material causes the resultant dispersion to have a grainy background if it is projected. Still another problem that may be encountered is a change in the electrical properties of the cell caused by the dyes which are usually salts.

Another approach is to use certain compounds such as the bis (dithobenzil) nickel complexes which have been found to absorb energy in the infrared spectrum but not in the visible spectrum. However, typically the absorption band is narrow and a solution of this compound in N-methylpyrrolidinone absorbs strongly at 940 nM but very little at 850 nM, the wavelength of gallium arsenide lasers. As a result, such a solution would not absorb sufficient energy from a gallium arsenide laser to adequately thermally address a liquid crystal cell.

SUMMARY OF THE INVENTION

It is a primary object of this invention to provide an improvement liquid crystal cell.

It is another object of this invention to provide an improved thermally addressable liquid crystal cell.

It is still another object of this invention to provide a liquid crystal cell adapted to absorb energy in the infrared spectrum.

It is yet another object of this invention to provide a liquid crystal cell adapted to have a low absorption in the visible part of the spectrum.

It is yet still another object of this invention to provide an absorbing layer adapted to absorb energy from a gallium arsenide laser.

It is a further object of this invention to provide a liquid crystal cell adapted to absorb energy from a gallium arsenide laser and have a low absorption in the visible part of the spectrum.

These and other objects of this invention are accomplished by a liquid crystal cell having an absorbing layer adapted to absorb energy in the infrared spectrum and to absorb less energy in the visible spectrum. The absorbing layer is positioned next to the liquid crystal layer or alternatively next to the conductive transparent layer of the liquid crystal cell. An example of an absorbing layer is the reaction product of bis (dithiobenzil) nickel and a polyamide. Such a layer absorbs at least 90% of the gallium arsenide laser wavelengths and at the same time permits transmission in the visible wavelength to be at least 80%.

Other objects of this invention will be apparent from the following detailed description wherein a preferred embodiment of the present invention is clearly shown.

DETAILED DESCRIPTION OF THE INVENTION

This invention concerns a liquid crystal cell having an absorbing layer of material which absorbs in the infrared spectrum but which is relatively transparent in the visible spectrum. When an infrared beam, for example, a gallium arsenide laser, thermally addresses the liquid crystal cell, the absorbing layer, in accordance with this invention, effectively absorbs energy at 850 nM. The absorbed energy in the absorbed layer heats specific areas of the liquid crystal layer to form the desired image. The efficient absorption of the absorbing layer increases the speed of the liquid crystal cell for a source with a given power level. Alternatively, the absorption layer enables the liquid crystal cell to operate with a source having a lower power level. Another advantage of this invention is the relative low absorption in the visible spectrum. This property enables the liquid crystal cell to have sharp lines as well as maximum contrast.

Figure 1:
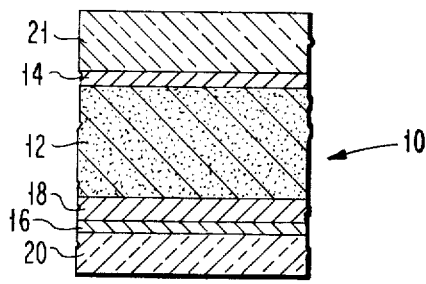
FIGS. 1 through 3 are cross-sectional views of different embodiments of transmittive liquid crystal cell displays having at least one infrared absorbing layer.

Referring now to the drawings, FIG. 1 is a cross-sectional view of the basic structure set forth in this invention. The liquid crystal cell 10 contains a liquid crystal layer 12. Any suitable liquid crystal material may be used. Examples of such material are n-octyl-cyanobiphenyl and its homologs. Positioned on either side of the liquid crystal layer 12 are transparent conductive layers 14 and 16. An example of a material suitable for the transparent conductive layers are a mixture of tin oxide and indium oxide. In accordance with this invention an absorbing layer 18 is positioned between the transparent conductive layer 16 and the liquid crystal layer 12. The layer 18 does not have to be positioned directly adjacent to the liquid crystal layer 12 since it may be positioned on the other side of layer 16.

The absorbing layer 18 is a layer which absorbs energy in a narrow specific range in the infrared spectrum and absorbs relatively little energy in the visible spectrum (3500 to 7000A). In a preferred embodiment the absorbing layer 18 is the reaction product of bis (dithiobenzyl) nickel having the structure

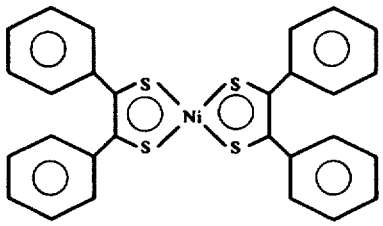

and a polyamide. This reaction product is particularly well suited for absorbing gallium arsenide laser beams at a wavelength of 850 to 875 nM.

The reaction products of a polyamide and the following nickel complexes set forth below have been found to be absorbant at certain wavelengths of the infrared spectrum as well as to transmit light in the visible spectrum.

positioned on top of the transparent conductive layers 30 and 32, respectively.

Sufficient dye, i.e., the reaction product of the nickel complex and a polyamide, is incorporated in the absorbing layers to provide between 60 to 70% absorption in each layer. The total absorption provided by using two absorbing layers is still of the order of 90%.

Figure 2:
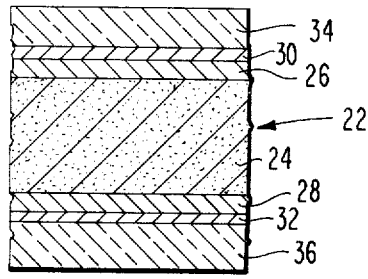

One advantage of using two absorbing layers is that the heat is available on both sides of the liquid crystal layer. As a result, the heat diffuses into the liquid crystal layer at a faster rate thereby permitting shorter addressing times. For example, a typical addressing time of the two layer device shown in FIG. 2 is of the order of 25$\mu$ sec. compared with a time of 40$\mu$ sec. for the one layer device shown in FIG. 1.

Another advantage of using two absorbing layers is that the dye concentration in each layer can be lower and/or the layer can be thinner. The solubility of these dyes are relatively low and using lower concentrations avoids any problems associated with particles crystallizing out of solution. In addition the use of thinner absorbing layer is desirable because such layers are smoother and flatter resulting in an improved appearance over thicker layers which may have a rippled appearance.

Figure 3:
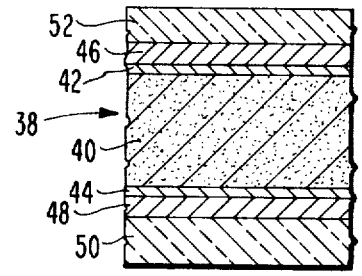

In FIG. 3 a liquid crystal cell 38 has transparent con-

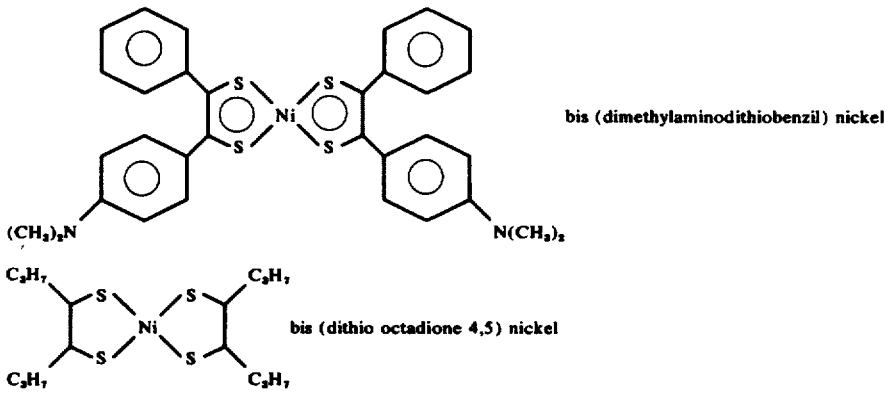

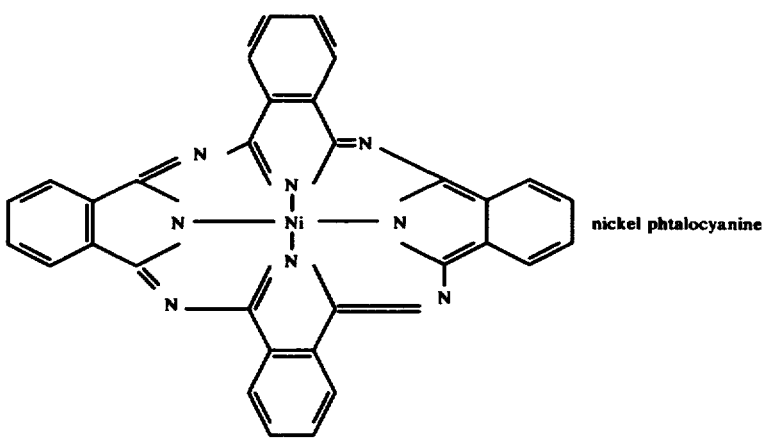

The absorbing layer 18 is positioned on a glass layer 20.

In FIG. 2 a liquid crystal cell 22 has absorbing layers 26 and 28 deposited on either side of liquid crystal layer 24, respectively. Transparent conducting layers 30 and 32 are positioned on top of the absorbing layer 26 and 28, respectively. Glass layers 34 and 36 are ductive layers 42 and 44 positioned directly on either side of liquid crystal layer 40. Absorbing layers 46 and 48 are positioned on the transparent conductive layers 42 and 44, respectively. Glass layers 50 and 52 are positioned on absorbing layers 48 and 46 respectively. The difference between FIGS. 2 and 3 is the position of the absorbing layer relative to the transparent conductive layers and to the liquid crystal layer.

FIG. 3 is a preferred embodiment since it does not have a dielectric loss in the absorbing layer as does the device shown in FIG. 2. As a result, the FIG. 3 cell can be cleared with a lower voltage. Typically the clearing voltages of FIG. 3 cells are of the order of 40% lower. For example, a voltage of about 90 volts would be needed to clear the FIG. 2 cell whereas about 40 volts would clear the FIG. 3 cell.

Figure 4:
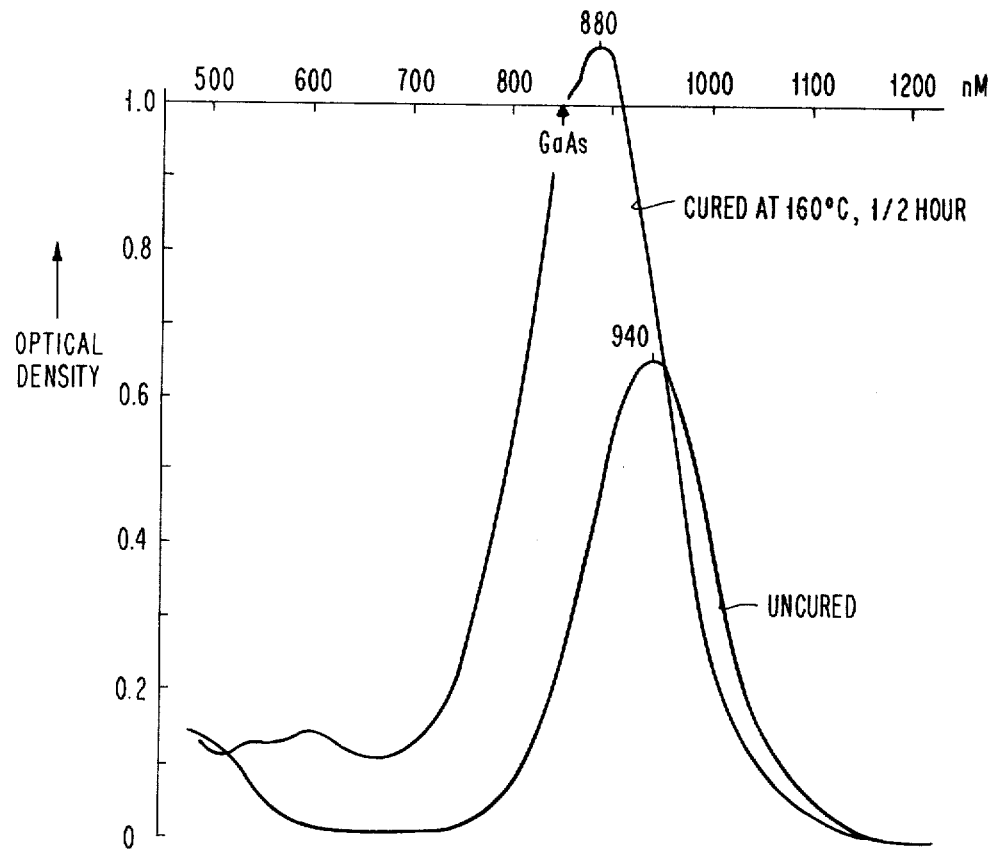
FIG. 4 is a graph illustrating the absorption of the reaction product of bis (dithiobenzil) nickel and polyamide.

FIG. 4 illustrates the absorption of reacted as well as unreacted mixture of bis (dithiobenzil) nickel and polyamide. The unreacted mixtured in N-methypyrrolidinone absorbed strongly at a wavelentth of 940 nM. The reacted mixture which was cured at 160° C for one-half hour absorbed strongly at 880 nM, a wavelength which absorbs a gallium arsenide laser.

EXAMPLE 1

A solution was prepared by dissolving 37 milligrams of bis (dithiobenzil) nickel in 500 milligrams of hot N-methylpyrrolidinone. This solution was diluted to contain one part bis (dithiobenzil) nickel to a thousand parts solvent. The dilute solution had an absorption maximum at 940 nM with an optical density equal to 0.65 for 10 mm path length. The absorption at 850 nM provided an optical density of 0.2 which is almost transparent. The hot solution was mixed with 500 milligrams of a polyamide (RC5057 made by Dupont). The solution was cooled and then filtered. The absorption spectrum of the resultant solution is substantially the same as before the polyamide was added. The resultant mixture was applied onto a hot substrate by a spinning technique and cured at 180° C for ½ hour to provide a 1 micron thick film. This film has an optical density of 0.9 at 875 nM and 0.85 at 850 nM. This film absorbed 85% of a CW gallium arsenide laser at 77° K. This film had an optical density of 0.1 to 0.2 in the visible spectrum. The film was examined under the microscope and did not show any evidence of crystalline precipitation. The film was then examined in a projection system and the cell showed a clear background.

EXAMPLE 2

A film was formed of the reaction product of bis (dimethylamino dithiobenzil) nickel and polyamide by the same steps described in Example 1. The absorption maximum is at 1.12–1.15 nM for the unreacted material. The absorption shifts after curing to show wide band absorption around 1.0 nM. This absorption layer is particularly useful for YAG lasers which transmit energy at 1.06 nM. Several films were prepared having absorption between 40–60% at 1.06 nM.

EXAMPLE 3

An absorbing layer was formed from the solution containing 100 milligrams of the bis (dithio octadione 4,5) nickel, 1 ml of N-methypyrrolidinone and 2 grams polyamide by the steps set forth in Example 1. The reaction product film absorbs strongly between 0.7 and 0.9 nM. The thermal stability of this film was poor and the film was easily damaged by a laser beam.

EXAMPLE 4

A device having the structure shown in FIG. 3 was made. The absorbing layers were made of the reaction product of bis (dithiobenzil) nickel and polyamide and had a thickness of 1 micron after baking at 180° for ½ hours. The transparent conductive coatings were made by sputtering indiumtin oxide. These layers were about 1000 angstroms thick. The glass layers were 60 mils thick. This device was thermally addressed with a gallium arsenide laser beam. The optical density was 1.2 to 1.4 at 840 nM. A page was written in approximately one second with this device using a laser. The writing on this page was then erased in 10 to 20 milliseconds at a voltage of 40 to 50 volts.

I claim:

1. A liquid crystal cell adapted to be thermally addressed with a laser taken from the group consisting of gallium arsenide and YAG comprising
   a liquid crystal layer having first and second sides,
   a first conductive transparent layer located on said first side,
   a second conductive transparent layer located on said second side, and
   an absorbing layer adapted to absorb at least 40% of the energy in the infrared spectrum of said laser located on said first side, said layer absorbing significantly less energy in the visible spectrum, said absorbing layer containing the reaction product of a nickel complex compound and a polyamide.

2. A liquid crystal cell as described in claim 1 wherein said absorbing layer contains the reaction product of a nickel complex compound taken from the group consisting of bis (dithiobenzil) nickel, bis (dimethylamino-dithiobenzil) nickel, bis (dithiooctadione 4,5) nickel and nickel phtalocyine and a polyamide.

3. A liquid crystal cell as described in claim 2 wherein said absorbing layer contains the reaction product of bis (dithiobenzil) nickel and a polyamide.

4. A liquid crystal cell as described in claim 1 wherein said absorbing layer contains the reaction product of a nickel-heterocyclic sulfur complex compound and a polyamide.

5. A liquid crystal cell adapted to be thermally addressed with a laser taken from the group consisting of gallium arsenide and YAG comprising
   a liquid crystal layer having first and second sides,
   a first conductive transparent layer located on said first side,
   a second conductive transparent layer located on said second side,
   a first absorbing layer adapted to absorb at least 40% of the energy in the infrared spectrum of said laser located on said first side, said layer absorbing significantly less energy in the visible spectrum, said first absorbing layer containing the reaction product of a nickel complex compound and a polyamide, and
   a second absorbing layer adapted to absorb at least 40% of the energy in the infrared specturm of said laser located on said second side, said layer absorbing significantly less energy in the visible spectrum, said second layer containing the reaction product of a nickel complex compound and a polyamide.

6. A liquid cystal cell as described in claim 5 wherein said first absorbing layer is positioned between said liquid crystal layer and said first conductive transparent layer.

7. A liquid crystal cell as described in claim 5 wherein said first conductive transparent layer is positioned between said liquid crystal layer and said first absorbing layer.

8. A liquid crystal cell as described in claim 7 wherein said second conductive transparent layer is positioned between said liquid crystal and said second absorbing layer.

9. A liquid crystal cell as described in claim 8 wherein said first absorbing layer is positioned on a glass substrate.

10. A liquid crystal cell as described in claim 8 wherein said first and second absorbing layers contain the reaction product of bis (dithiobenzil) nickel and a polyamide.

11. A liquid crystal cell as described in claim 5 wherein said first and second absorbing layers contain the reaction product of a nickel-heterocyclic sulfur complex compound and a polyamide.

12. A liquid crystal cell as described in claim 5 wherein said first and second absorbing layers contain the reaction product of a nickel complex compound taken from the group consisting of bis (dithiobenzil) nickel, bis (dimethylaminodithiobenzil) nickel, bis (dithiooctadione 4,5) nickel and nickel phtalocyine and a polyamide.

* * * * *